United States Patent
Chamandy (10) Patent No.: US 7,877,916 B2
(45) Date of Patent: Feb. 1, 2011

(54) GARMENT MARKING CLIP AND LABEL STRIP

(75) Inventor: Paul A. Chamandy, Ithaca, NY (US)

(73) Assignee: Avery Dennison Corporation, Pasadena, CA (US)

( * ) Notice: Subject to any disclaimer, the term of this patent is extended or adjusted under 35 U.S.C. 154(b) by 334 days.

(21) Appl. No.: 11/788,665

(22) Filed: Apr. 20, 2007

(65) Prior Publication Data

US 2007/0273520 A1 Nov. 29, 2007

Related U.S. Application Data

(63) Continuation-in-part of application No. 11/438,844, filed on May 23, 2006.

(51) Int. Cl.
*G09F 3/20* (2006.01)
(52) U.S. Cl. .............. 40/658; 40/661.04; 24/3.12; 24/555; 24/562; 24/545
(58) Field of Classification Search ............ 40/658, 40/661.04, 322; 24/3.12, 641, 555, 561, 24/562, 563, 545
See application file for complete search history.

(56) References Cited

U.S. PATENT DOCUMENTS

| | | | |
|---|---|---|---|
| 303,755 A | 8/1884 | Schwartz | |
| 835,383 A | 11/1906 | Akerly | |
| 897,476 A * | 9/1908 | Milliken | 24/562 |
| 1,668,109 A | 5/1925 | Egan | |
| 1,719,504 A | 7/1925 | Egan | |
| 2,635,368 A * | 4/1953 | Greb-Lasky | 38/70 |
| 2,857,696 A | 10/1956 | Barrow | |
| D192,845 S | 5/1962 | Cohen | |
| 3,214,813 A | 11/1965 | Goldman | |
| D218,511 S | 8/1970 | Sarro | |
| 3,535,808 A | 10/1970 | Morrish | |
| 3,797,076 A | 3/1974 | Watkin | |
| 3,962,758 A * | 6/1976 | Knappe et al. | 24/562 |
| 4,045,899 A | 9/1977 | Richardson | |
| 4,332,060 A * | 6/1982 | Sato | 24/67.9 |
| 5,175,913 A * | 1/1993 | Mackie et al. | 24/562 |
| 5,407,109 A * | 4/1995 | Zuckerman | 223/85 |
| 5,477,995 A * | 12/1995 | Dooley et al. | 223/85 |
| 5,495,644 A | 3/1996 | Mesher et al. | |
| 5,524,801 A * | 6/1996 | Dooley et al. | 223/85 |
| 5,561,932 A | 10/1996 | Bracken | |
| 5,590,822 A * | 1/1997 | Zuckerman | 223/85 |
| 5,611,469 A * | 3/1997 | Eiley et al. | 223/85 |
| 5,642,840 A * | 7/1997 | Abdi | 223/85 |

(Continued)

FOREIGN PATENT DOCUMENTS

DE 31 14671 10/1982

(Continued)

*Primary Examiner*—Gary C Hoge (57) ABSTRACT

There are disclosed embodiments of a marking clip for marking garments which may be stacked flat on a surface. The marking clip is generally U-shaped with leg portions joined by a bight portion and is preferably molded of flexible, resilient, plastics material and bears repetitive indicia along the outer surface of the leg and bight portions. Two or more marking clips may be coupled to provide selected combinations. A label strip with respective indicia and with an RFID transponder and/or a machine-readable code can be adhesively adhered either directly to a garment across a fold or to the marking clip.

3 Claims, 10 Drawing Sheets

U.S. PATENT DOCUMENTS

| | | |
|---|---|---|
| D382,592 S | 8/1997 | Maruchi |
| 5,692,332 A | 12/1997 | Bracken |
| D399,527 S | 10/1998 | Price |
| D409,400 S * | 5/1999 | Peruzzo ................... D6/328 |
| 5,970,641 A * | 10/1999 | Bracken, Jr. ................ 40/638 |
| 5,992,887 A | 11/1999 | Maruchi |
| D443,899 S | 6/2001 | Stephens |
| 6,241,133 B1 * | 6/2001 | Morgan et al. ............... 223/96 |
| 6,457,218 B1 | 10/2002 | Lawrence |
| 6,499,633 B1 * | 12/2002 | Pogmore .................... 223/85 |
| 6,915,602 B2 | 7/2005 | Davis et al. |
| 6,948,269 B2 | 9/2005 | Wang |
| 2003/0101551 A1 | 6/2003 | Levesque |
| 2004/0035526 A1 * | 2/2004 | Chamandy et al. .......... 156/293 |
| 2005/0060923 A1 * | 3/2005 | Ardern ........................ 40/658 |
| 2005/0085121 A1 * | 4/2005 | Kukita et al. ................ 439/488 |
| 2005/0091896 A1 * | 5/2005 | Kotik et al. .................. 40/633 |
| 2005/0099303 A1 * | 5/2005 | Zuckerman .............. 340/572.8 |
| 2005/0102876 A1 | 5/2005 | Kelly |

FOREIGN PATENT DOCUMENTS

EP             1 168 239             1/2002

* cited by examiner

GARMENT MARKING CLIP AND LABEL STRIP

CROSS-REFERENCE TO RELATED APPLICATION

This is a continuation-in-part of U.S. patent application Ser. No. 11/438,844, filed May 23, 2006.

BACKGROUND

1. Field

The embodiments relate to the field of marking garments.

2. Brief Description of the Prior Art

It is known to mark folded garments in stacks by adhesively adhering size strips, wherein the each size strip is adhesively adhered to the folded garment across the fold line and on both sides of the garment as disclosed in U.S. Pat. Nos. 5,561,932; 5,692,332; and 5,970,641. Some garments are comprised of materials that are adversely affected by the adhesive on the strips, for example suede, leather, corduroy, brushed cotton, spandex-containing fabrics and other delicate fabrics. This makes it practically prohibitive to use such adhesive strips on those types of materials. Other prior art disclosures are found in the following U.S. Pat. Nos.: Des. 192,845; Des. 218,511; 303,755; Des. 382,592; Des. 399,527; Des. 443,899; 835,383; 1,668,109; 1,719,504; 2,857,696; 3,214,813; 3,535,808; 3,797,076; 4,045,899; 5,495,644; 5,992,887; 6,457,218; 6,915,602; 6,948,269; and Published Application No. 2003/0101551.

SUMMARY OF THE INVENTION

One embodiment comprises a flexible, resilient clip which can be slipped over the fold line of a folded garment or over the waistband of a garment to mark the garment with the size and/or other features of the garment. These features preferably appear in the form of repetitive occurrences of the same indicia. The clip can have a pair of leg portions and a bight or connecting portion connected to the leg portions in a U-shaped configuration. The inner surface of at least one of the leg portions preferably have one or more frictional members which help keep the clip from slipping off the garment. The end portion of one or both leg portions can be slightly flared apart to facilitate slipping the clip over the folded garment. The indicia can be formed directly on the clip as by printing. Alternatively, a flexible indicia-bearing strip can be applied along the outer surface of the clip. Even when the clip-bearing folded garments are arranged in a stack or on hangers, the indicia are visible because the indicia appear at the bight portion of each clip. The clip is reusable, and even the user can design different indicia-bearing clips on-site because a clip without an indicia strip can have an adhesive strip applied by store personnel, or a clip with an indicia strip can be stripped of its indicia strip and any desired indicia strip can be applied to the clip. Therefore, it is apparent that the inventory of garment marking clips and marking strips can be kept to a minimum.

In another embodiment, clips can be ganged in side-by-side connected relationship. This again keeps the clip inventory to a minimum. The clips can be suitably interlocked, for example, by pins.

In another embodiment a label strip bearing repetitive indicia can also have an RFID transponder and/or a machine-readable code. The label strip can be adhered by adhesive on the label strip either directly to a folded garment at a fold or to a clip that embraces the garment at the fold.

The clips can be color coded to indicate differences in the garments, whether the garments are on sale, for date coding and the like. In addition, the marking strips can be color coded differently from the clips with which they are associated.

Merchants can keep sets of marking clips bearing various sizes and use them on garments that correspond to those sizes.

DETAILED DESCRIPTION OF THE PREFERRED EMBODIMENTS

Figure 1:
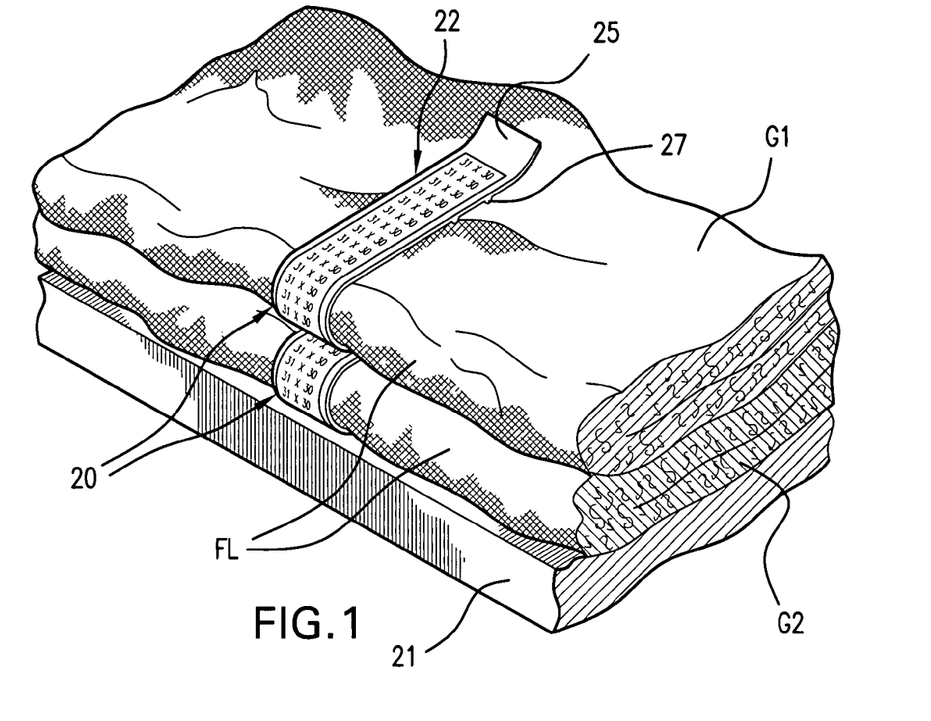
FIG. 1 is a perspective view of a stack of folded garments on a support with an embodiment of marking clips.
Figure 2:
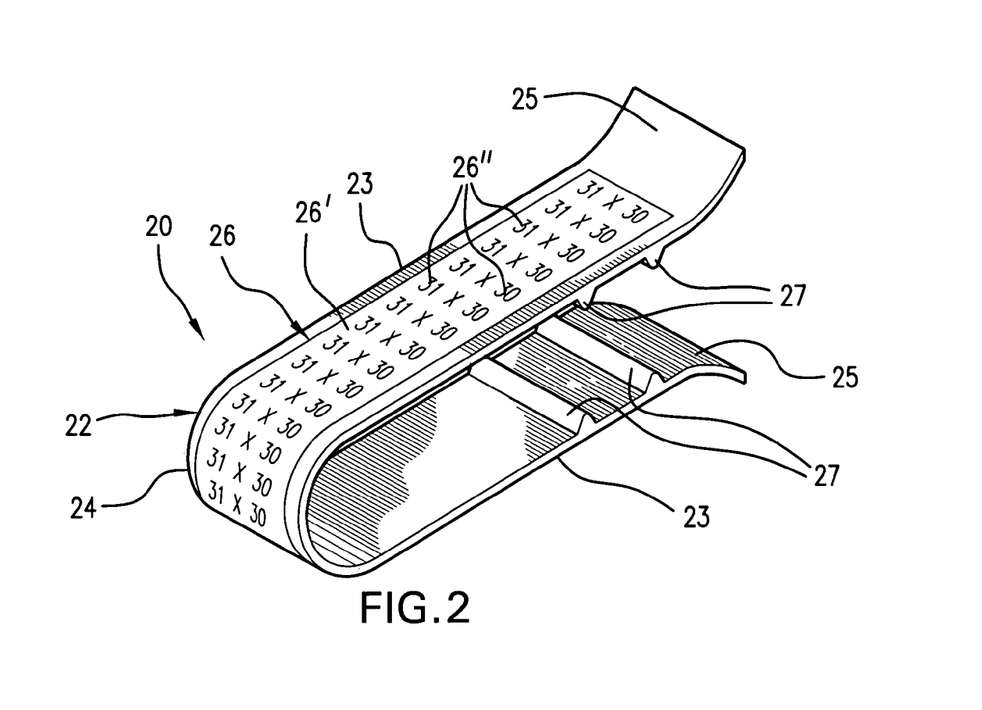
FIG. 2 is a perspective view of one of the marking clips.
Figure 3:
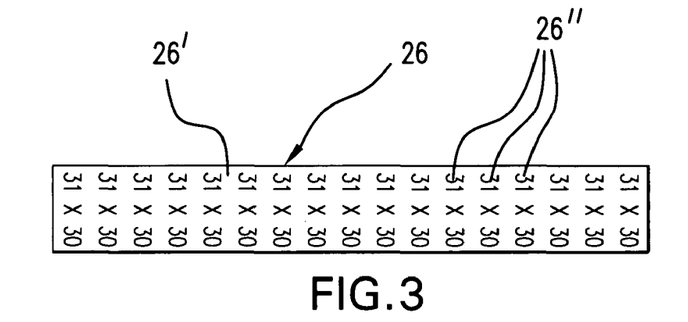
FIG. 3 is a top plan view of a marking strip in a flat state and showing respective indicia along the length of the strip.
Figure 4:
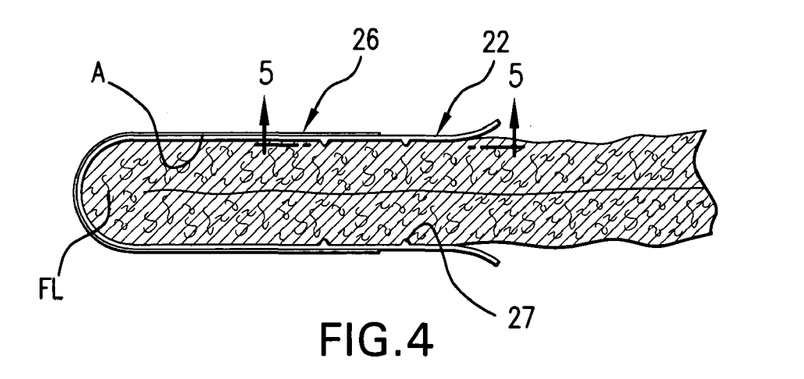
FIG. 4 is a partly sectional view showing the clip and the indicia-bearing strip combination embracing a folded garment.
Figure 5:
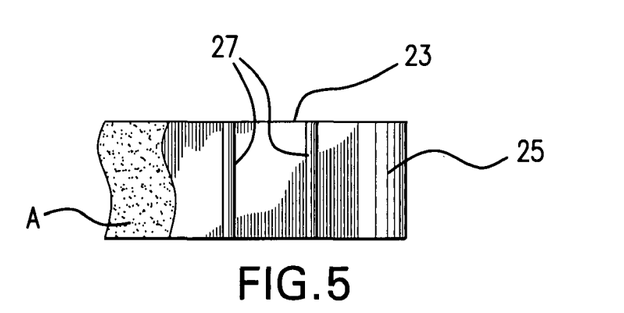
FIG. 5 is a view of a portion of the clip taken generally along line 5-5 of FIG. 4.
Figure 6:
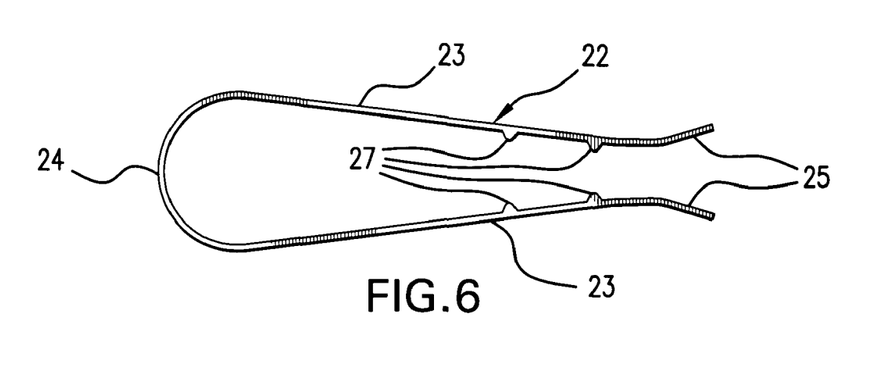
FIG. 6 is an as-molded end elevational view of the clip without the marking strip.

Referring to FIG. 1, there are shown two garment marking clips 20 applied to upper and lower folded sides or layers of stacked respective garments G1 and G2 lying flat on a horizontal support 21. Each marking clip 20 includes a clip 22 of one-piece molded construction preferably composed of flexible, resilient plastics material. Each clip 22 is shown to have a pair of elongate leg portions 23 joined to a bight portion 24. The clip 22 is generally U-shaped. The bight portion 24 is preferably rounded and makes a smooth transition with the leg portions 23. The free end portions 25 of leg portions preferably flare outwardly slightly and extend away from each other to aid in inserting the clip 22 over the folded portion of the garment adjacent fold line FL or over the waistband. A marking strip 26 bearing repetitive indicia, illustrated to be size indicia, is adhesively adhered to the outer surface of the clip 22 along the leg portions and the bight portion 24. A plan view of the marking strip 26 before it has been applied to the clip 22 is illustrated in FIG. 3. The marking strip 26 is preferably comprised of a one-piece sheet or strip of film 26' on which the indicia 26" are printed. While some marking strips may bear size, such as 31×30, others may bear different sizes. The underside of the marking strip 26 has a uniform coating of either removable or permanent adhesive A (FIGS. 4 and 5) which adheres the marking strip 26 to the outer surface of the clip 22. The clip 22 shown in FIG. 6 is in the as-molded condition showing the leg portions 23 converging toward each other away from the bight portion 24. In the as-molded condition, the marking strip 26 is adhesively adhered to the outer surface of the clip 22 to form the marking clip 20. When the marking clip 20 is applied to a garment, the leg portions 23 expand to take on an expanded generally parallel orientation relative to each other as shown in FIGS. 1, 2 and 4. To assist in gripping the garment, the clip 22 preferably has one or more frictional members in the form of grippers 27 preferably on each leg portion 23, shown to be in the form of smooth transverse ridges extending parallel to each other, however, various forms and types of frictional members can be used so long as they do not damage the garment.

The clip 22 is of one-piece molded plastics construction of any suitable material which is flexible and resilient. The clip can be made of transparent, translucent or opaque material or can be clear and colorless. Alternatively, the clip 22 can be of any selected color and some clips 22 in a store's inventory can be in a set of one color and other clips 22 can be in sets of other and different colors. In addition, the film 26' on which the indicia 26" are printed can be of any selected color and the indicia themselves can be of any selected color the same or different from the color of the clip 22. Therefore, a merchant can color code its garment merchandise according to size, style, source of manufacture, date code, whether or not the garment is on sale, and the like. The clip 22 together with the marking strip 26 as illustrated can constitute the two-part marking clip 20.

The marking clip 20 can alternatively be comprised of the clip 22 printed with repetitive indicia such as the indicia on the marking strip 26, if desired. The color of the printed indicia in combination with the color of the clip 22 on which the indicia are printed can provide a distinguished marking clip 20.

Figure 7:
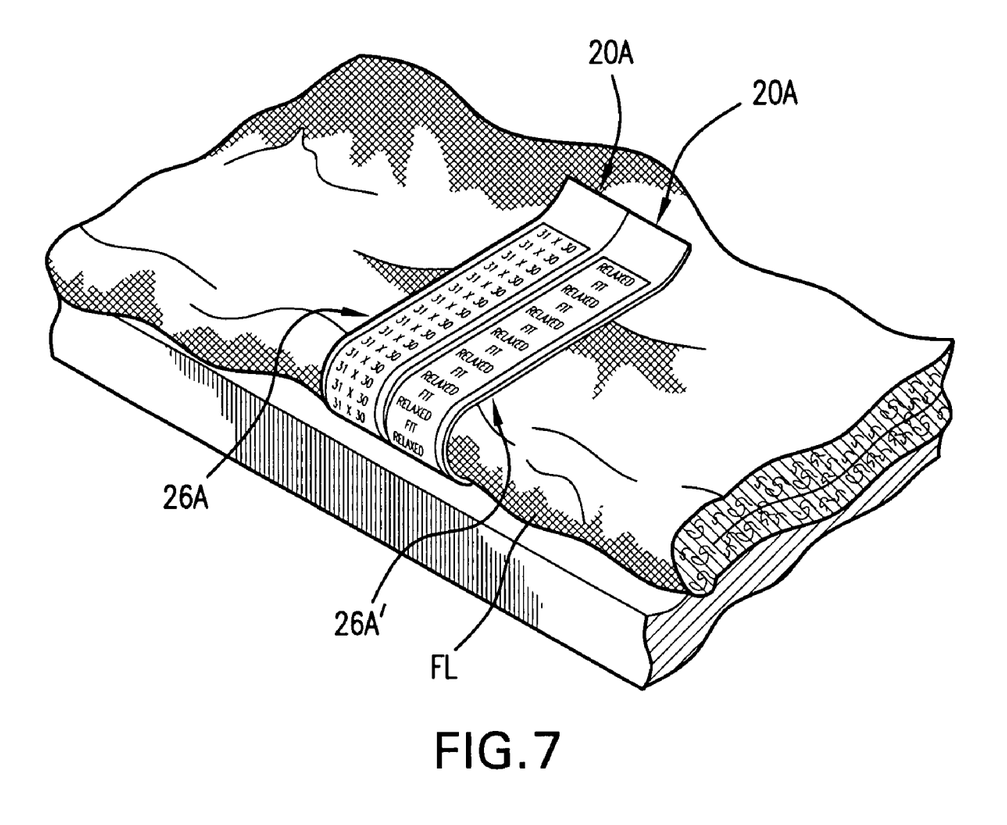
FIG. 7 is a perspective view of a folded garment on a support, wherein ganged clips embrace a garment across a folded portion of the garment.
Figure 8:
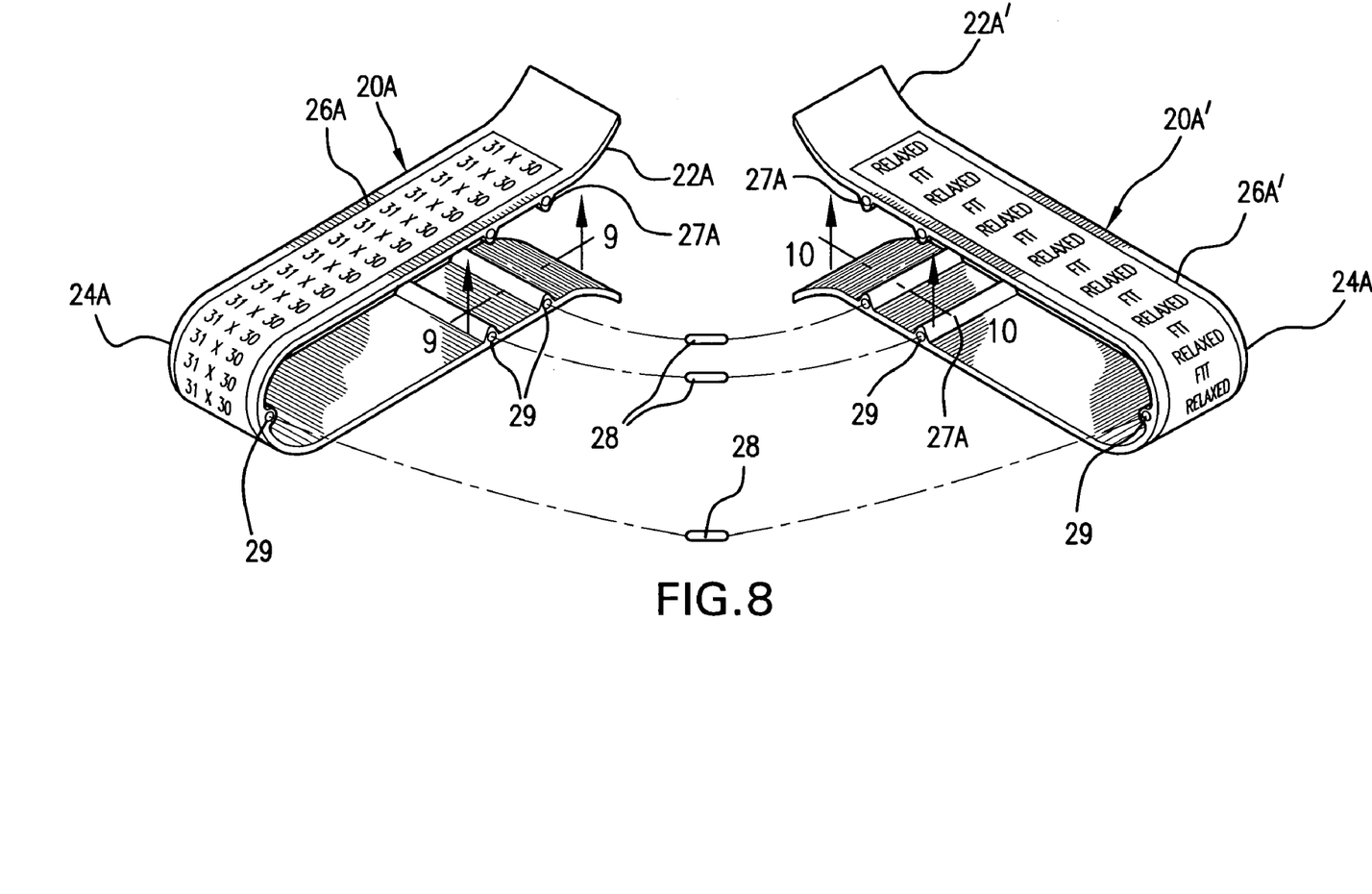
FIG. 8 is an exploded rotated perspective view of a pair of indicia-bearing clips connectable to each other.
Figure 9:
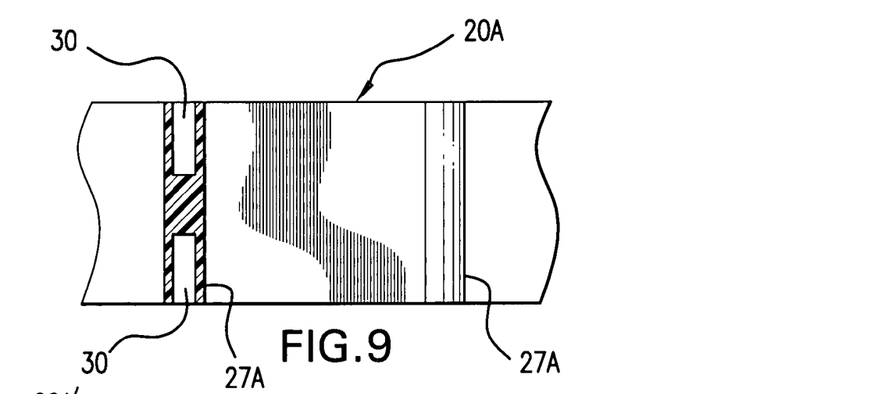
FIG. 9 is a partly sectional view taken generally along line 9-9 of FIG. 8.
Figure 10:
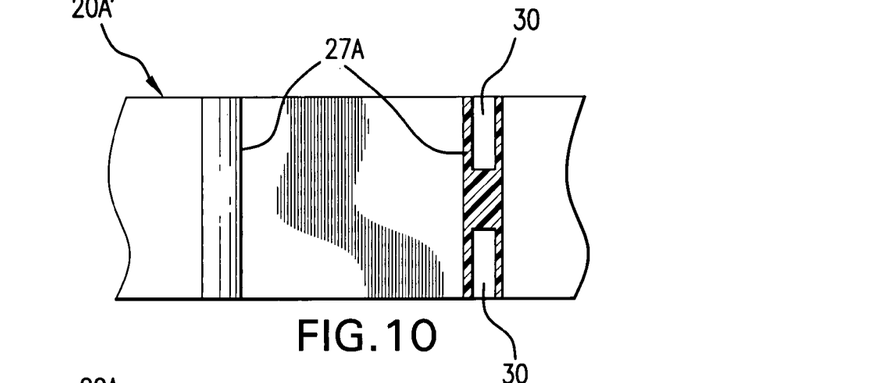
FIG. 10 is a partly sectional view taken generally along line 10-10 of FIG. 8.
Figure 11:
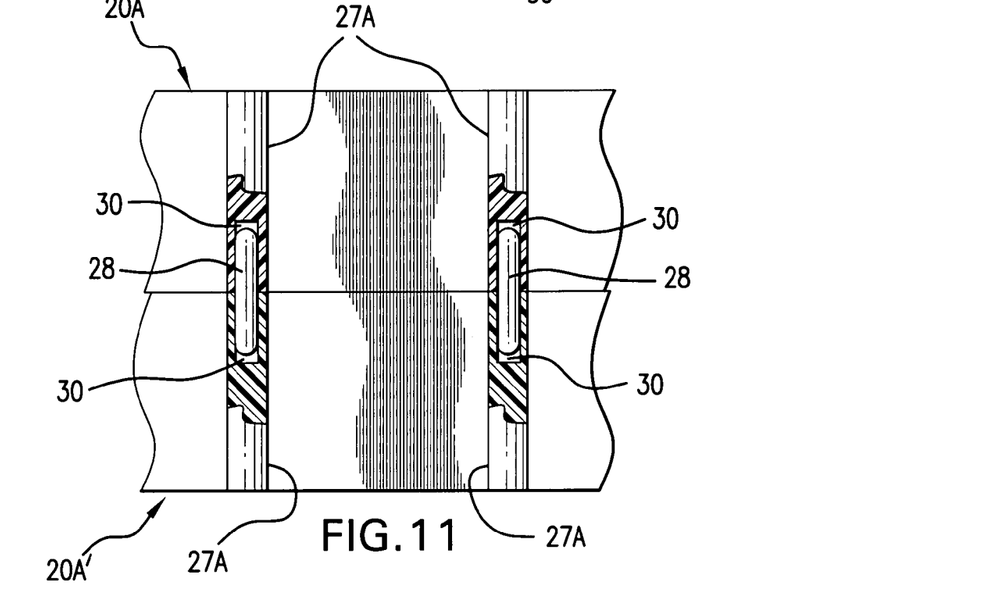
FIG. 11 is a fragmentary view of two side-by-side clips coupled to each other through pins extending into holes in adjacent clips.
Figure 12:
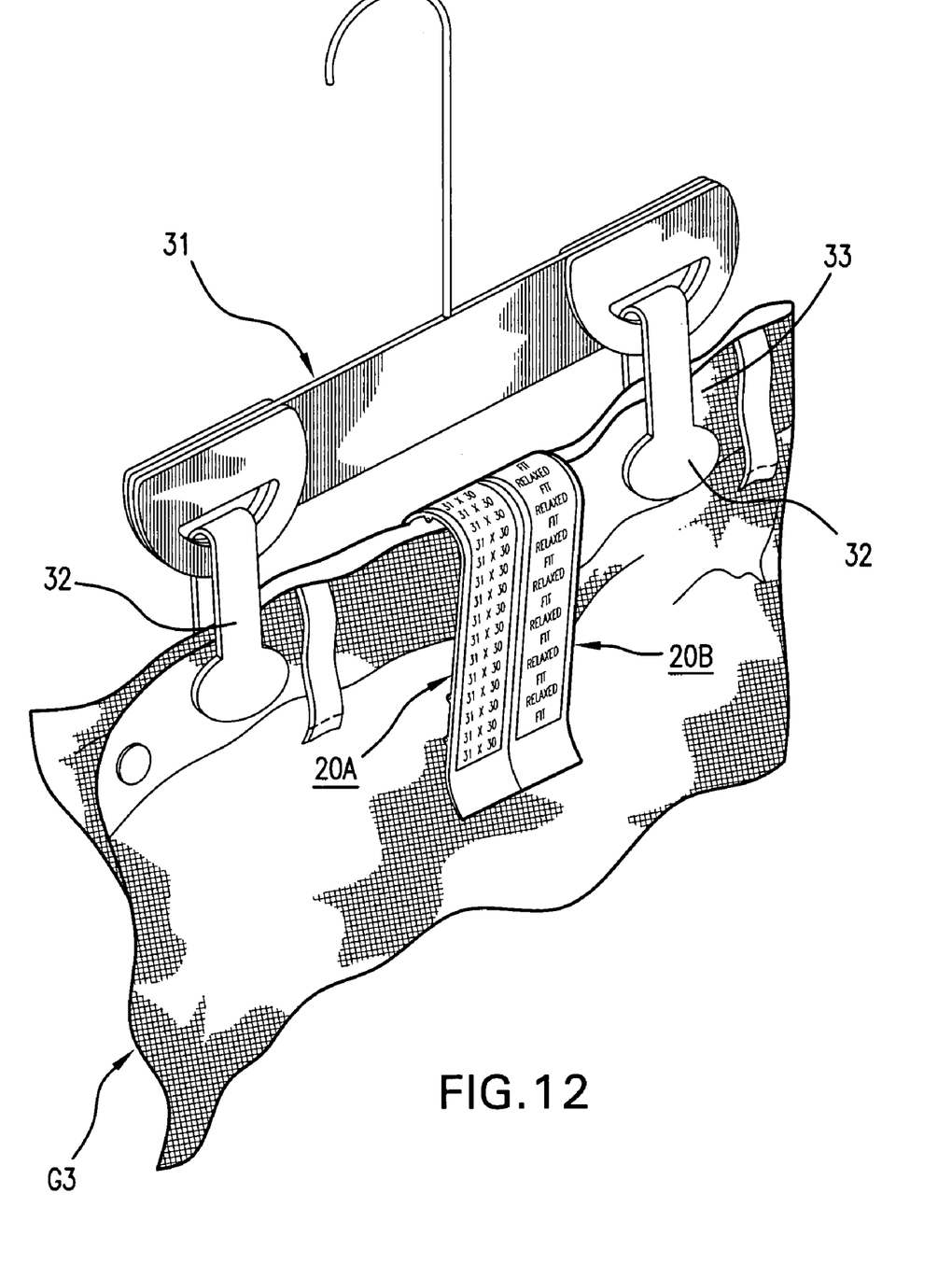
FIG. 12 is a perspective view of a pair of marking clips applied across the waistband of a pair of hanging trousers.

With reference to the embodiment of FIGS. 7 through 11, it is shown that multiple marking clips 20A and 20A' can be coupled or ganged to provide a composite marking clip when coupled. The marking clip 20A and the marking clip 20A' are the same as in the embodiment of FIGS. 1 through 7 except they have structures by which two or more clips 20A, 20A' and so on may be coupled to function as a unit as shown in FIG. 7. The frictional members 27A corresponding to frictional members 27 except they can receive round pins 28. One of the pins 28 is received in holes 29 in bight portions of the clips 20A and 20B (FIG. 12). FIGS. 9 through 11 show an embodiment of structure for coupling the clips 20A and 20A'. The frictional members 27A have blind round holes 30 that receive the 20A' pins 28 which releasably connect the marking clips 20A and 20A' to each other. For example, the marking clips 20A and 20A' can be paired to provide information which a single clip may not be able to provide. As illustrated, the clip 20A can have repetitive size indicia "31×30" and the clip 20A' can have different indicia such as the illustrated "RELAXED FIT". Like with the marking clip 20, the marking strips 26A and 26A' can be adhesively adhered to the clips 22A and 22A' or the indicia can be printed directly onto the clips 22A and 22A'. While the merchant would have clips 20A that bear sizes different from 31×30, clips 20A may have other indicia or legends such as "REGULAR FIT".

The coupling of the marking clips 20A and 20A' can be accomplished by various structures other than as illustrated in the drawings, for example, a pin (not shown) molded integrally with one marking clip can fit into a hole of the other marking clip.

The marking clips 20A and 20A' are shown to have the same width or transverse dimension. However, they need not be the same width. For example the marking clip 20A' can be narrower than the marking clip 20A, and vice versa.

With reference to FIG. 12, there is shown a garment in the form of a pair of trousers folded into two side-by-side layers generally indicated at G3 suspended from a conventional hooked hanger generally indicated at 31. Clasps 32 of the hanger 31 grip the trousers along the waistband 33. A marking clip such as the marking clip 20, or alternatively plural connected clips such as marking clips 20A and 20B as shown in FIG. 12 can be received over the waistband. The garment G3 is gripped by the hanger 31 or any other suitable hanger and the clip 20 or connected clips 20A and 20B can be applied across the waistband of the garment B3. In the event the garment is folded in half and hung vertically on a suitable hanger in an inverted U-shaped arrangement, the clip 20 or connected clips 20A and 20B for example can be slipped vertically downward over the fold line to embrace the garment adjacent the fold line.

Figure 13:
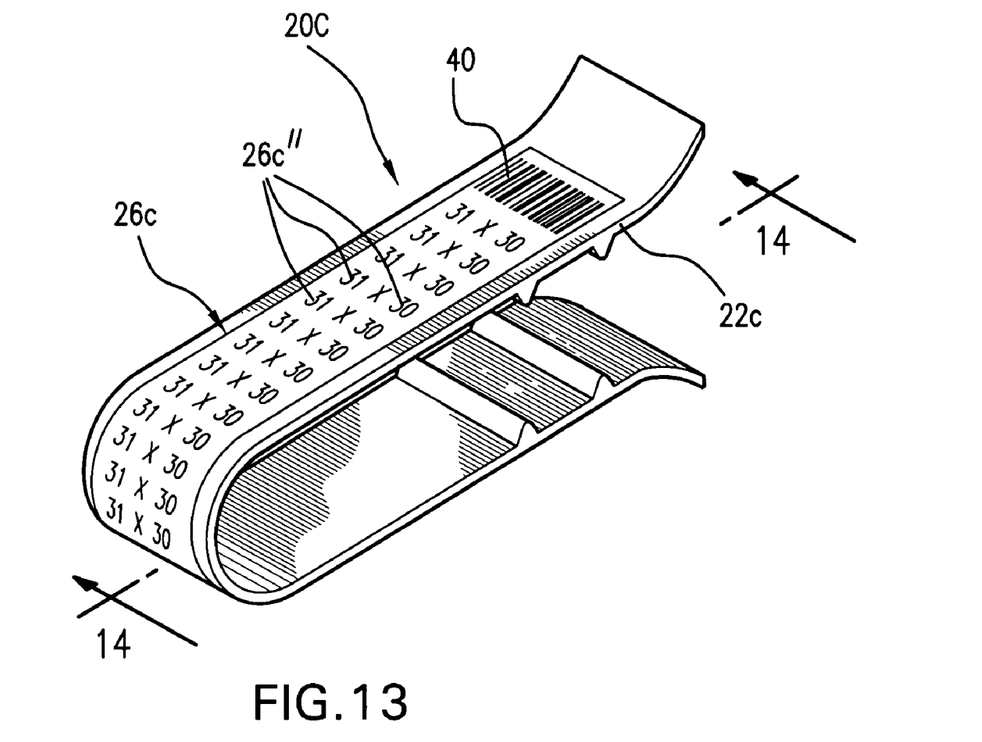
FIG. 13 is a perspective view of an alternative form of marking clip which includes a label strip having an RFID transponder and a machine-readable code.
Figure 14:
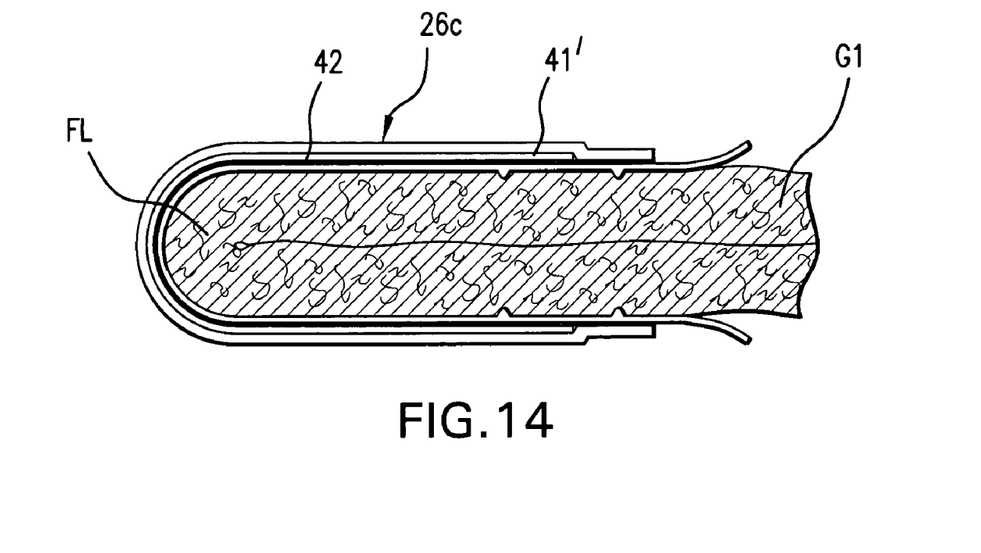
FIG. 14 is a sectional view taken generally along line 14-14 of FIG. 13, but showing a folded garment embraced by the marking clip.

With reference to FIG. 13, there is shown a marker clip 20C which can be identical to the marker clip 20 except as follows. A marker strip or label strip or label 26c has indicia 26c" appearing repetitively just as the marker strip 26 has repetitive indicia 26". In addition, the label strip 26c has a machine-readable code 40 on its outer surface as shown in FIG. 13. The code 40 is illustrated to be a bar code. The underside of the label strip 26c has an RFID (radio frequency identification) transponder 41 and adhesive 42 (shown in solid black) preferably underlies the entire label 26c and the transponder 41. The indicia 26" can be preprinted on the outer surface of the label 26c or they can be printed at the same time the code 40 is printed.

Figure 15:
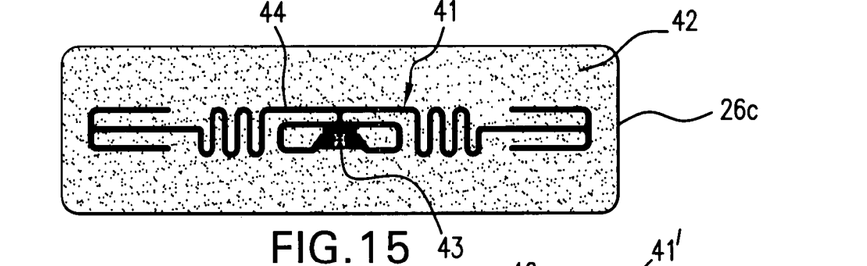
FIG. 15 is a bottom plan view of a label strip as shown in FIG. 13 with an example of an RFID transponder.
Figure 16:
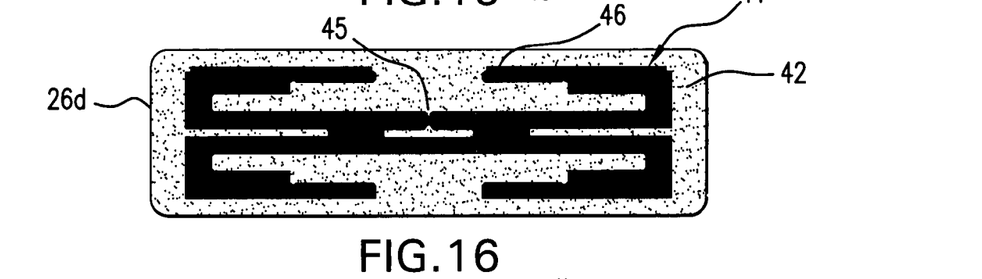
FIG. 16 is a bottom plan view of a label strip as shown in FIG. 13 with an example of an alternative RFID transponder.

FIG. 15 shows an Ultra High Frequency (UHF) transponder generally indicated at 41 of a known design with an RFID chip 43 and an antenna 44, and FIG. 16 shows an Ultra High Frequency transponder generally indicated at 41' of a different known design having an RFID chip 45 and an antenna 46. The label strip 26c of FIG. 15 and the label strip 26d of FIG. 16 are the same except for the transponders 41 and 41'.

Figure 17:
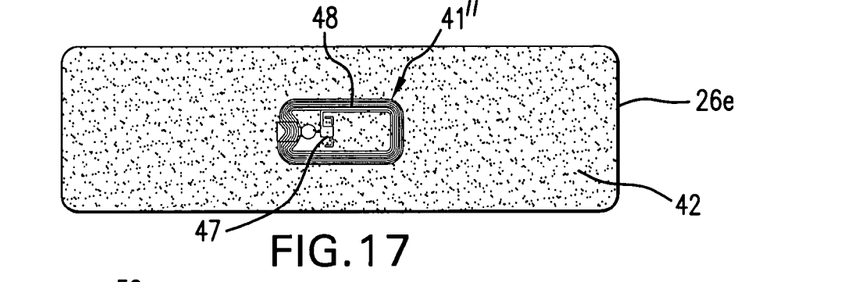
FIG. 17 is a bottom plan view of a label strip as shown in FIG. 13 with an example of another alternative RFID transponder.

FIG. 17 shows a High Frequency (HF) transponder 41" with a chip 47 and a winding 48 but in other respects the label trip 26e is the same as the label strips 26c and 21d. It is noted that the chips 43, 45 and 47 are all located centrally of the opposite ends of the elongate label strips 26c, 26d and 26e. Therefore, each of the chips 43, 45 and 47 is located at the bend or bight of the clip 20c which is at the fold line FL of the garment.

Figure 18:
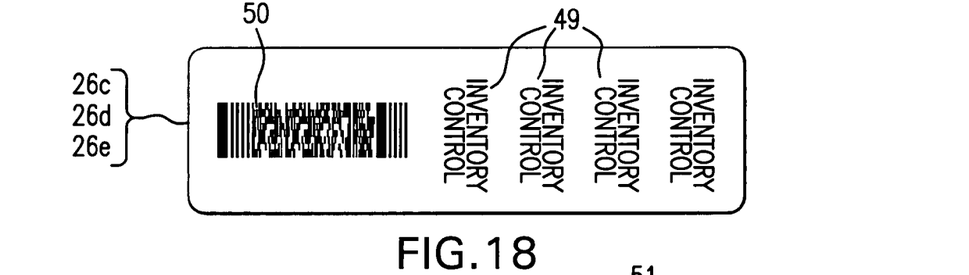
FIG. 18 is a top plan view of an alternative label strip from the one shown in FIG. 13.

FIG. 18 shows that the outer side or face of the label strips 26c, 26d and 26e can have different repetitive indicia 49 and a machine-readable code 50 known as a PDF417 code which differs from the indicia 26" and the code 40.

Figure 19:
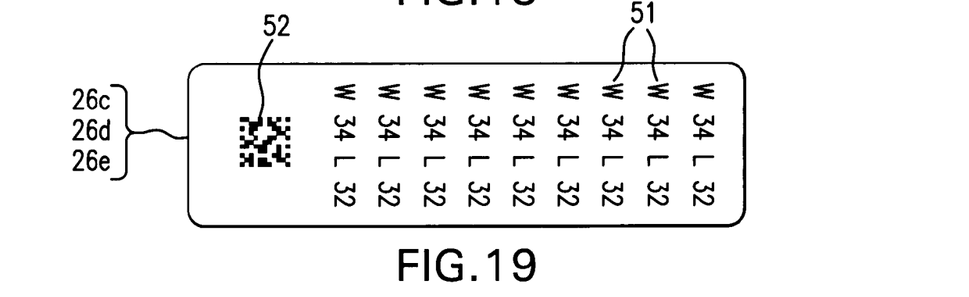
FIG. 19 is a top plan view of another alternative label strip from the ones shown in FIGS. 13 and 18.

FIG. 19 shows that the outer side or face of the label strips 26c, 26d and 26e can also have different repetitive indicia 51 and a different machine-readable code such as a Data Matrix code 52.

Figure 20:
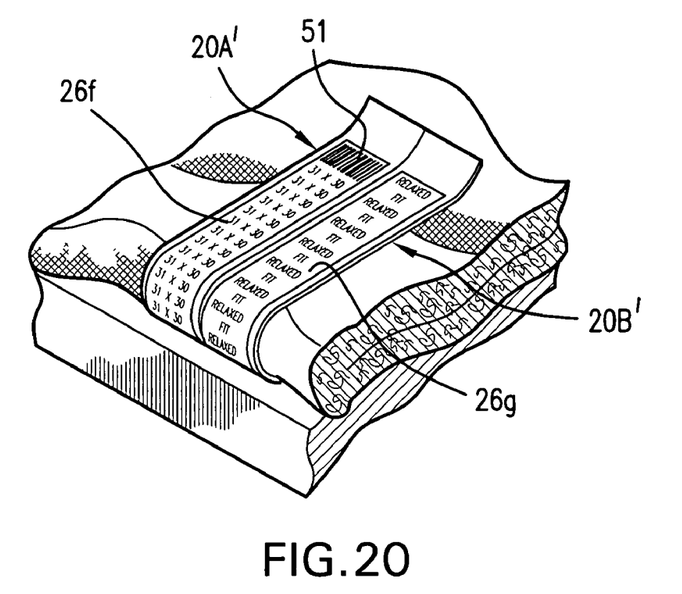
FIG. 20 is a perspective view of a folded garment on a support, wherein ganged clips with a machine-readable code, an RFID transponder and repetitive indicia.

The embodiment of FIG. 20 is identical to the embodiment of FIGS. 7 through 12, except than in the FIG. 20 embodiment clips 20A' and 20B' have respective label strips or labels 26f and 26g, either one or both of which can have a machine-readable code 51 and an RFID transponder as in the embodiments of FIGS. 13 through 20.

Figure 21:
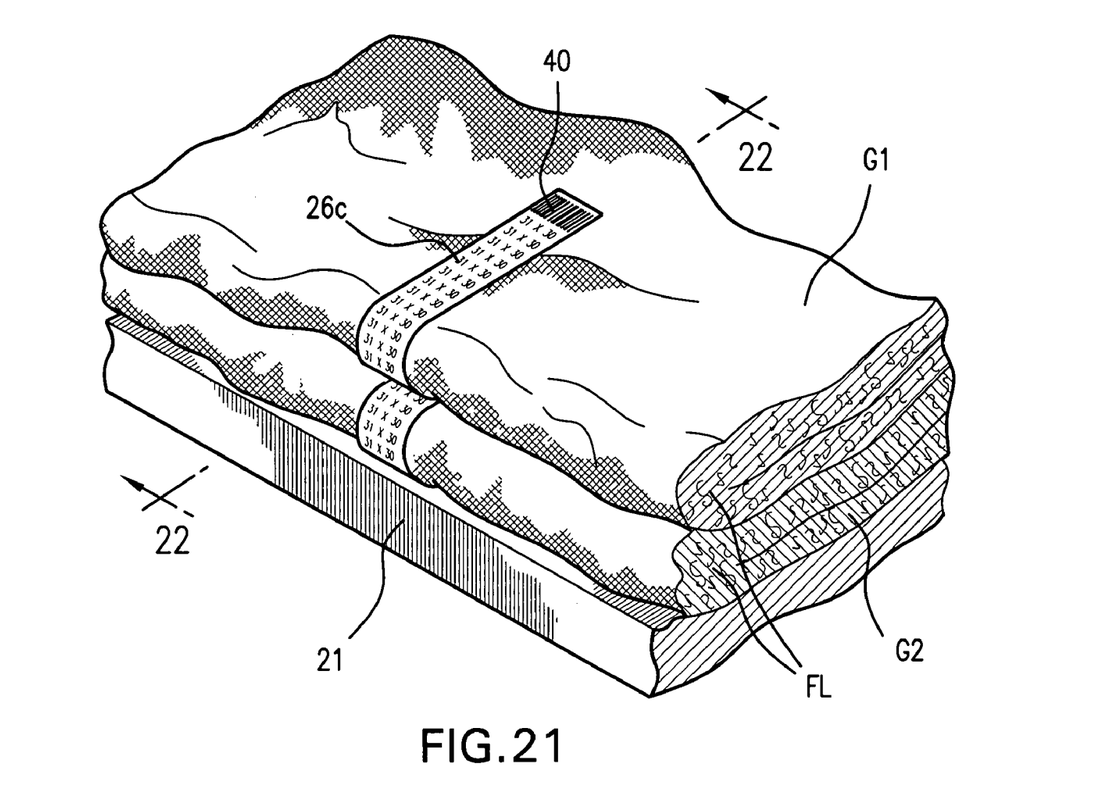
FIG. 21 is a perspective view of a plurality of folded garments on a support, showing labels adhered to the garments across their fold lines.
Figure 22:
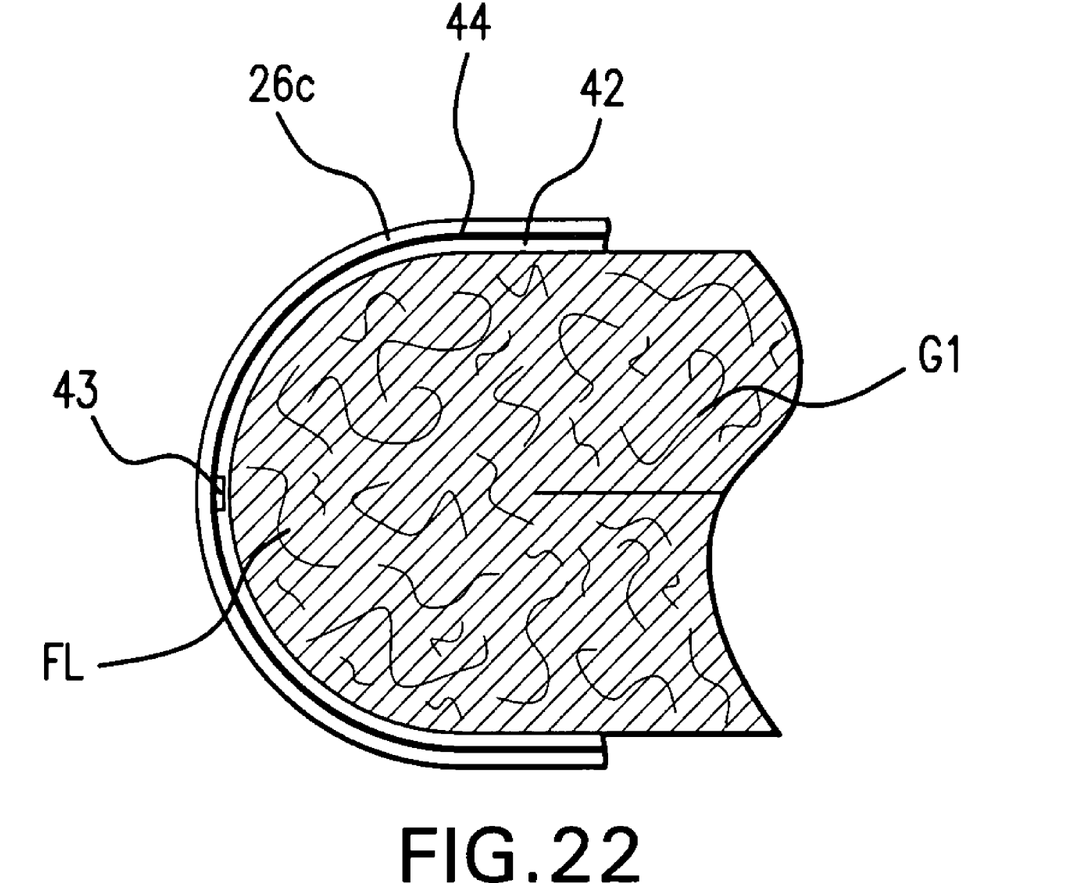
FIG. 22 is an enlarged, fragmentary view of the label strip applied across a fold line of a folded garment.

In the embodiment of FIGS. 21 and 22, the label strips or labels 26c can be adhered directly to the garments G1 and G2. The adhesive 42 on the label strips 26c is of low tackiness so that the label strips 26c can be adhered directly to the garments and yet be readily removable. The label strips 26c have transponders which can be written to and/or read. As shown, the chip 43 for example is disposed at the fold line FL and the antenna 44 can be of any suitable type such as disclosed in any one of FIG. 15, 16 or 17.

The clip 20c including its label 26c, the clips 20A' and 20B' and their respective labels 26f and 26g, and the label 26c per se, each with an RFID transponder and/or a bar code, can be used in conjunction with the method embodiments exemplified as follows:

1. The RFID transponder and/or the bar code can be encoded with a unique identifier, the label itself or a clip can be applied to the garment around a fold of the folded garment, and subsequently the RFID transponder and/or the bar code can be read or decoded.

2. The garment manufacturer typically applies a bar code tag or label to each garment. The bar code identifies the garment by size, color, style, SKU number, etc. When a marker clip such as the marker clip 20C is to be used, its label 26c is first printed and the transponder encoded in an RFID bar code printer disclosed for example in Publication No. US2005/0280537, the disclosure of which is incorporated herein by reference in its entirety. In the event a transponder on the label 26c is encoded and a bar code on the label 26c is printed, it is preferred that they both bear the same information. In order to associate the marker clip 20C to the garment in the retailer's data base, the association can be established in different ways. For example, each clip 20C has a unique code or identifier such as an identification number so that all the clips 20C have different codes or identification numbers. The association between the unique code on the marker clip 20C and garment can be established by scanning the bar code on both the label 26c and on the garment tag and inputting the marker clip code and the garment code into the computer which can merge or associate the two codes in a single file. Alternatively, the RFID data coded in the transponder can be decoded and inputted into the computer the same as the bar coded data was inputted. At the point of sale such as the checkout counter the transponder can be decoded or the bar code on the marker clip 20C can be scanned and/or the bar code on the garment tag can be scanned, and the inventory file can be updated to show the reduction in inventory. In the event the marker clip 20C becomes separated from the garment to which it relates, the bar code on the clip 20C can be scanned or the transponder can be decoded so that the marker clip 20C can be re-associated with a garment having the same characteristics, such as size, style, color, etc. as are on the garment tag. In that the marker clip 20C is removed at the point of sale, the marker clip 20C can be recycled or reused with a different garment provided it is re-associated with the information relating to that different garment.

3. In the event the label 26c is to be applied directly to a garment as in FIGS. 21 and 22, the procedure may be the same as in 2 above, except that the label 26c is not applied to clip 22c, and additionally, there is no need to recycle any clip. In this event, the label 26c can be RFID encoded and/or printed with a bar code at the garment manufacturer's factory and applied to the garment along with the garment tag. Alternatively, the label 26c can be encoded and is bar code printed at the retailer's distribution center or at the retailer's stores.

As an alternative to the foregoing, the RFID encoded and/or bar code printed label 26c used on the garment can have the same garment data as would normally be carried on a garment tag, thereby eliminating the need for a separate garment tag.

Other embodiments and modifications of the invention will suggest themselves to those skilled in the art, and all such of these as come within the spirit of this invention are included within its scope as best defined by the appended claims.

I claim:

1. A marking clip for a folded garment folded about a fold line and defining two opposing outward facing sides, said marking clip comprising:
    a first leg having a free end;
    a second leg having a free end;
    a bight joining the legs together opposite their free ends to define a U-shaped clip;
    wherein said legs and said bight are integrally formed from a flexible resilient material such that the legs converge toward one another as they extend away from the bight and absent application of an external force the free ends of the legs nowhere abut one another, said legs being spreadable to embrace the sides of the garment with the bight being adjacent the fold line, wherein the U-shaped clip has an outer surface and the marking clip further includes a flexible label strip having garment related indicia disposed along one side thereof and the other side thereof provided with an adhesive, the label strip including an RFID transponder, and the adhesive on the label strip adhering the label strip to the outer surface of the U-shaped clip; and
    a plurality of fiction members, including at least one friction member formed on an inside surface of the first leg and at least one friction member formed on the inside surface of the second leg;
    wherein said inside surfaces of the first and second legs face one another and each of the plurality of friction member comprises a raise ridge protruding from the inside surface on which the ridge resides;
    wherein each of the friction members includes a hollow channel therein for receiving one end of a corresponding pin, such that at least two clips can be selectively joined together via one or more pins inserted into the hollow channels of the friction members on the respective clips.

2. The clip of claim 1 wherein:
    the free end of said first leg has a distal most portion furthest from the bight; and
    the free end of the second leg has a distal most portion furthest from the bight;
    said distal most portions on the free ends of the first and second legs being flared outwardly away from one another.

3. The clip of claim 2, wherein the plurality of fiction members are located in regions between the bight and the distal most portions of the free ends of the first and second legs, such that none of said friction members reside on the distal most portions of the free ends of the first and second legs.

* * * * *